United States Patent [19]

Nagae et al.

[11] 4,307,691
[45] Dec. 29, 1981

[54] IGNITION TIMING CONTROL SYSTEM FOR INTERNAL COMBUSTION ENGINE

[75] Inventors: Hiromitsu Nagae; Noboru Sugiura; Takashi Yoshinari, all of Katsuta, Japan

[73] Assignee: Hitachi, Ltd., Tokyo, Japan

[21] Appl. No.: 104,717

[22] Filed: Dec. 18, 1979

[30] Foreign Application Priority Data

Dec. 21, 1978 [JP] Japan ................. 53-158984

[51] Int. Cl.³ .................... F02P 5/08; F02P 5/04
[52] U.S. Cl. .................... 123/415; 123/412; 123/427; 123/418
[58] Field of Search ........... 123/410, 412, 415, 406, 123/407, 418, 427

[56] References Cited

U.S. PATENT DOCUMENTS

| | | | |
|---|---|---|---|
| 3,885,534 | 5/1975 | Webster | 123/415 |
| 3,972,310 | 8/1976 | Gambill | 123/415 |
| 4,009,699 | 3/1977 | Hetzler et al. | 123/416 |
| 4,128,885 | 12/1978 | Valek et al. | 123/416 |
| 4,138,982 | 2/1979 | Hattori et al. | 123/415 |
| 4,142,489 | 3/1979 | Menard | 123/415 |
| 4,142,490 | 3/1979 | Hosaka et al. | 123/415 |
| 4,201,163 | 5/1980 | Hattori et al. | 123/415 |

*Primary Examiner*—Raymond A. Nelli
*Attorney, Agent, or Firm*—Craig and Antonelli

[57] ABSTRACT

There is disclosed an ignition timing control system for an internal combustion engine which comprises a reference ignition signal generator, advance means for leading the ignition timing according to the number of engine revolutions, control means for controlling the ignition timing according to the pressure change in the intake pipe which varies with the engine load, a retard circuit for shifting the ignition timing by a selected retard angle with respect to the ignition timing which is determined by said advance means, and means for controlling the electric elements in said retard means to determine the retard angle thereof so as to cancel variation in the ignition timing due to atmospheric pressure change.

6 Claims, 12 Drawing Figures

IGNITION TIMING CONTROL SYSTEM FOR INTERNAL COMBUSTION ENGINE

This invention relates generally to an ignition system for an internal combustion engine, and more particularly concerns an ignition timing control system for an internal combustion engine.

In general, an ignition system for an internal combustion engine is provided with a negative pressure advance mechanism which detects a negative pressure in the intake pipe to control ignition timing, thus to control the ignition timing in accordance with the engine load.

The negative pressure advance mechanism basically consists of a piece of diaphragm which is subjected on one side to a reference pressure and on the other side to a negative pressure of the intake pipe. Negative pressure in the intake pipe will vary with the engine load. This means that if the atmospheric pressure is always constant, displacement in the diaphragm will change according to the engine load. Therefore, the ignition timing can be controlled according to the engine load by adjusting the signal generation timing of signal generator means according to the diaphragm displacement.

However, it is well known that the atmospheric pressure is not always constant and changes depending on the altitude above sea level where the automobile is running. In addition, the higher the altitude is, the lower the atmospheric pressure is. On the other hand, negative pressure in the intake pipe depends mainly on the number of engine revolutions regardless of the altitude. For this reason, the ignition timing will shift from the optimum ignition timing by the amount of the changed atmospheric pressure. In other words, since the prior art negative pressure advance mechanism is arranged so that a larger negative pressure in the intake pipe provides a larger advance angle; in the case where the car is running at a high altitude, even a larger negative pressure in the intake pipe will decrease the diaphragm displacement by the amount of the decreased atmospheric pressure thus to decrease the advance angle.

From the above consideration, it has been desirable to develop a negative pressure advance mechanism which controls the ignition timing in accordance with atmospheric pressure change due to the altitude where the car is running.

Figure 1:
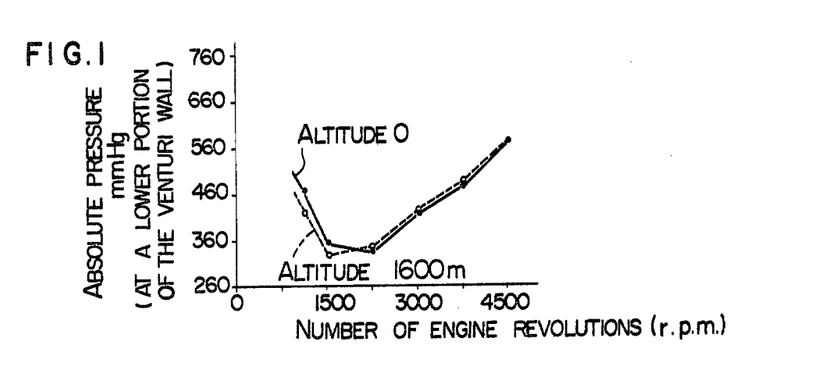
FIG. 1 is a graph showing measured results, in which negative pressure at a lower portion of the venturi wall is measured by changing the number of engine revolutions at altitudes of 0 and 1600 meters.

FIG. 1 is a graph showing measured results, in which negative pressure in a small hole provided on the intake pipe wall opposite to the throttle valve is measured at a lower portion of the venturi wall in the carbureter with respect to the number of engine revolutions. In FIG. 1, the solid line indicates the result when the negative pressure is measured by changing the number of engine revolutions in the top gear condition and at an altitude of 0 meter. On the other hand, the broken line indicates the result when the negative pressure is measured at an altitude of 1600 meters in a similar manner to for the solid line. It will be understood from FIG. 1 that the negative pressure at a lower portion of the venturi wall in the carbureter is substantially constant independently of the altitude, and change in the negative pressure conforms to one in the engine load in the general pattern.

From the above fact, direct control of the ignition timing according to change in the negative pressure can provide a control of the ignition timing according to the engine load regardless of the altitude.

It is an object of the present invention to provide an electrical negative pressure advance mechanism in an ignition timing control system which prevents the shift of the ignition timing from the optimum ignition timing, which results from change in the altitude where the car is running.

It is an another object of the present invention to provide an electrical negative pressure advance mechanism in an ignition timing control system which will not depend on change in the altitude where the car is driving, in place of a mechanical negative pressure advance mechanism.

The present invention is characterized by a retard ignition signal generator for generating a retard ignition signal shifted from a reference ignition signal by a selected retard angle, by an advance angle controller for controlling an advance angle according to the number of engine revolutions, by ignition timing control means for controlling the ignition timing according to the pressure difference between the negative pressure of the intake pipe and the atmospheric pressure wherein the optimum ignition timing is one shifted from the ignition timing determined by said advance angle controller by a retard angle obtained through said retard ignition signal generator, and by electric element controlling means for controlling the electric signal in said retard ignition signal generator to determine the retard angle thereof.

The present invention is further characterized by a retard ignition signal generator for generating a retard ignition signal shifted from a reference ignition signal by a selected retard angle, by an advance angle controller for controlling an advance angle according to the number of engine revolutions, and by electric element controlling means for controlling the electric signal in said retard ignition signal generator according to the absolute pressure in the intake pipe which changes depending not on the atmospheric pressure but on the engine load, to determine the retard angle thereof, wherein the optimum ignition timing lags the ignition timing determined by said advance angle controller by an angle obtained through said retard ignition signal generator.

The above and other objects and advantages of the present invention will become clear from the following description with reference to the accompanying drawings, in which:

Now, the present invention will be explained in more detail with reference to preferred embodiments in conjunction with accompanying drawings.

Figure 2A:
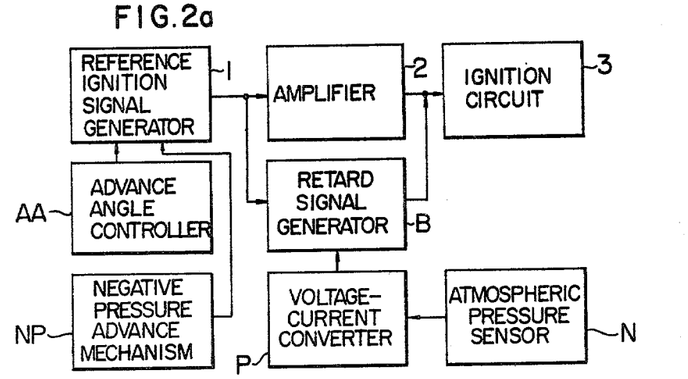
FIGS. 2a and 2b are block diagrams showing the basic principle of an ignition timing control system for an internal combustion engine in accordance with the present invention.
Figure 2B:
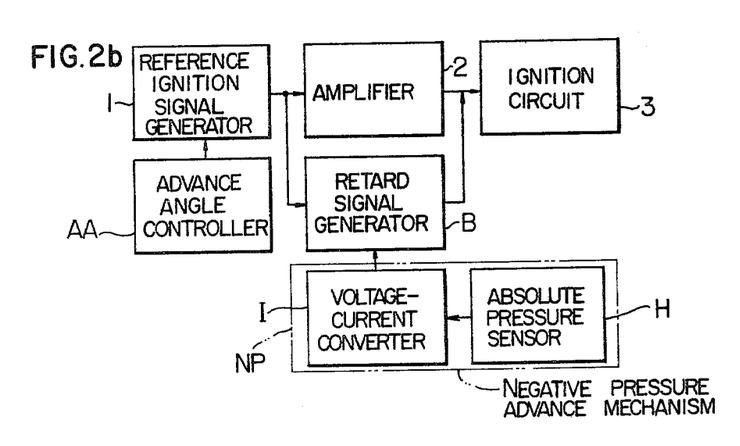

Turning first to FIGS. 2a and 2b, there is shown a reference ignition signal generator 1 which includes an ignition timing detector, for example, an electromagnetic pickup as a typical one. The reference ignition signal generator 1 cooperates with an advance angle controller AA which controls the ignition timing according to the number of engine revolutions, e.g., with a centrifugal advance mechanism, to generate a reference ignition timing signal. The reference ignition timing signal from the reference ignition signal generator 1 is also controlled by a negative pressure advance mechanism NP which controls the ignition timing according to the pressure difference between the atmospheric pressure and the negative pressure in the intake pipe that, in turn, varies depending on the engine load.

The reference ignition timing signal thus obtained will be supplied normally to a retard signal generator which converts it into an ignition timing signal shifted by a selected retard angle with respect to the reference ignition timing. The ignition timing signal generated at the retard signal generator is used to drive an ignition circuit.

The ignition timing control system is adjusted so that the retard ignition timing is at the optimum condition for the engine when the car is driving on a flatland.

When the car is running on a heights, the atmospheric pressure decreases and the pressure difference between the atmospheric pressure and the negative pressure in the intake pipe will become smaller than that when the car is running on a flatland, thus decreasing the advance angle of the negative pressure advance mechanism. In this case, an atmospheric pressure sensor is provided to detect a change in the atmospheric pressure as a voltage which is supplied to a voltage-current converter to convert the pressure change voltage to a current. The converted current acts to control the electric signal in the retard signal generator to determine the retard angle therein so that the retard angle is subtracted by the amount of the decreased advance angle, thereby compensating for the ignition timing varied with change in the atmospheric pressure.

Since it may be desirable to shift the ignition timing by a selected advance signal with respect to the normal optimum ignition timing in an application where the engine is in a special operation, the reference ignition signal generator 1 is connected to the ignition circuit 3 through an amplifier 2 so that the retard signal generator B can be disconnected as necessary.

In the case that the retard signal generator is disconnected, the ignition circuit 3 is driven by the reference ignition timing signal.

In FIG. 2b, a negative pressure advance mechanism NP is provided to directly control the electric elements in a retard signal generator B to determine the retard angle therein.

For this reason, the negative pressure advance mechanism NP includes an absolute pressure sensor H to detect as a varying absolute pressure a varying negative pressure in the intake pipe.

The negative pressure in the intake pipe (including the venturi portion in the carburetor) varies with the engine load but does not change practically with the atmospheric pressure. This means that detection of the negative pressure in the form of an absolute pressure can provide a signal according to the engine load regardless of the atmospheric pressure.

The voltage signal corresponding to the absolute pressure is converted to the corresponding current at a voltage-current converter I. The current controls directly the electric elements which determine the retard angle in the retard signal generator B. This can control the advance angle according to the engine load independently of the atmospheric pressure.

In this connection, it is the retard ignition timing controlled by the negative pressure advance mechanism NP that the engine is put into the optimum ignition timing condition.

An amplifier in FIG. 2b is provided for the same purpose as in FIG. 2a. For an absolute sensor of FIG. 2b, the pressure sensor of the type disclosed in the U.S. Pat. No. 3,894,433 (Ser. No. 409,416) to Satoshi Shimada of Oct. 25, 1973 may be used.

Figure 3:
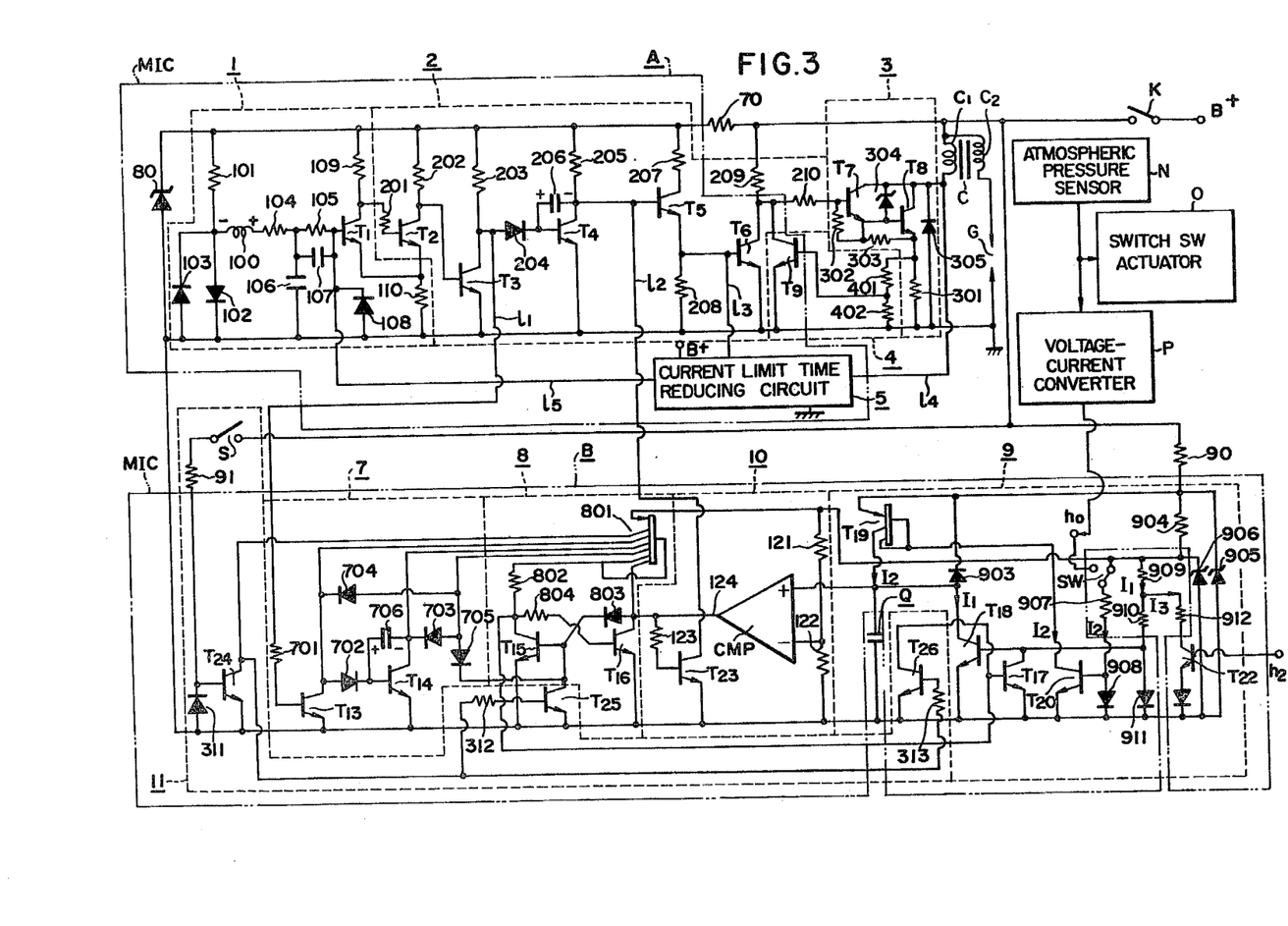
FIG. 3 is a circuit diagram of an embodiment of the ignition timing control system according to the present invention.

Turning now to the drawings, there is shown in FIG. 3 an ignition timing control system which includes a retard ignition signal generator. An advance ignition signal limiting circuit A consists of sections 1 to 5 and a retard ignition signal generator B consists of sections 7 to 11.

1 is a reference ignition signal generator, and 2 is a signal amplifier for shaping a signal from the reference ignition signal generator 1. The signal shaped in the amplifier 2 is applied to an ignition circuit 3. When the ignition circuit 3 receives the signal, it acts to cut off the primary current through an ignition coil C, thereby to cause the high voltage induced in the secondary winding of the ignition coil C to spark an ignition plug G. A current limiting circuit 4 is provided to limit the current in the primary winding of the ignition coil C in order to flow secondary current enough to ignite the ignition plug G. A current limit time reducing circuit 5 is activated in response to the activation of the current limiting circuit 4, and functions to the duty of a signal from the signal generator 1 so as to minimize the time required to limit the current.

The retard ignition signal generator B receives the reference ignition signal and produces a retard ignition signal to provide to the ignition circuit. As has been explained above, the retard ignition signal generator B consists of sections 7 to 11. 7 is a trigger signal generator which receives the reference ignition signal and generates a trigger signal. 8 is a bistable multivibrator which is driven in one state is response to a trigger signal from the trigger signal generator 7. A triangular pulse forming circuit 9 is provided to form a triangular pulse through a constant-current charge/discharge circuit which includes a capacitor Q. An output circuit 10 including a comparator CMP is provided to detect the discharging voltage across the capacitor circuit Q and as soon as the discharging voltage drops to a predetermined value, inverts the bistable multivibrator 8 to supply a retard ignition signal to the ignition circuit 3. A switching circuit 11 for connecting or disconnecting the retard ignition signal generator B to the advance ignition signal limiting circuit A functions to connect that trigger signal sent into the bistable multivibrator 8 to the earthed line when the retard ignition signal is unnecessary, and to pass the charge accumulated in the capacitor Q to the earth line.

In FIG. 3, the circuit encircled with a chain-dotted line and generally designated MIC is formed with a single chip of a monolithic integrated circuit (MIC). The chip MIC is mounted on a printed circuit board (in which resistors are already printed) along with a capacitor chip which is not contained in the chip MIC. The printed circuit board mounted with the chips is then jointed by means of suitable adhesive on a cooling body (which functions to radiate heat) on which a power transistor chip is already mounted, so that the elements on the printed circuit board and the power transistor chip on the cooling body are electrically inter-connected to form an ignition circuit module.

The operation of the ignition timing control system for an internal combustion engine according to the present invention will now be detailed in the following.

Referring first to the reference ignition signal generator 1 in the illustrated embodiment, a pick-up coil 100 is provided which is interlinked to the closed magnetic path formed in the distributor.

Figure 4:
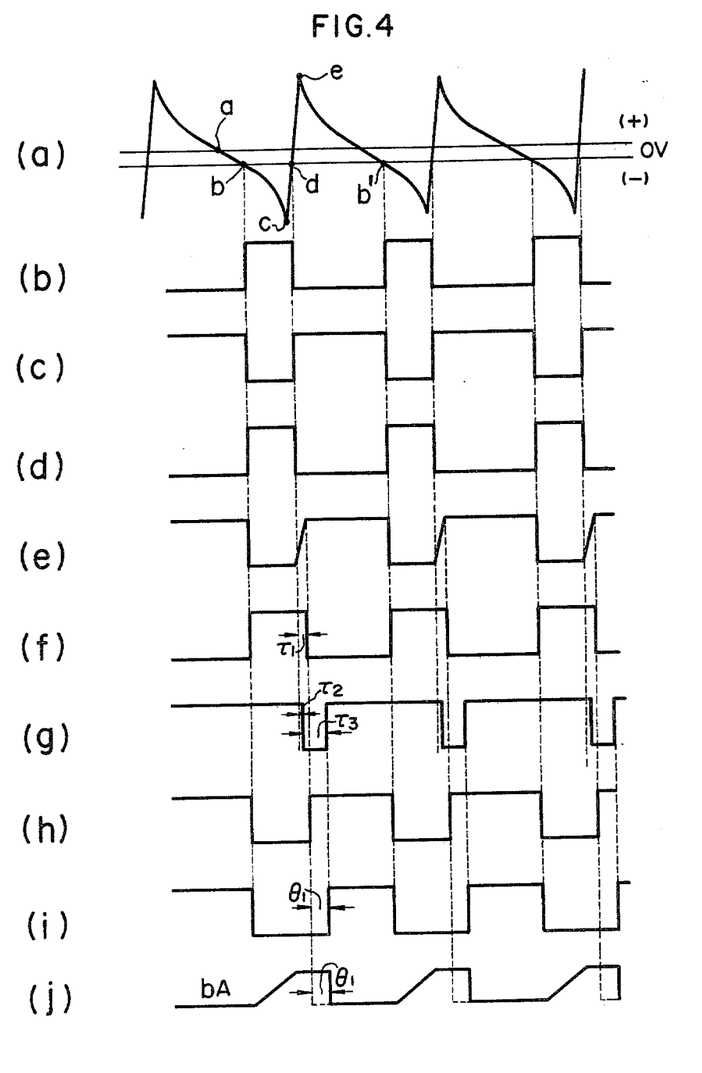
FIG. 4 is a timing diagram showing the operational waveforms of the major parts of the ignition timing control system of FIG. 3.

The shaft of the distributor rotates in synchronism with the rotation of the engine. The distributor is arranged so that while the distributor shaft rotates one turn, that is, the engine crank shaft rotates two turns, the magnetic flux through the closed magnetic path varies by the same turns as the number of the engine cylinders. As such magnetic flux varies, an alternating current such as shown in FIG. 4 (a) appears across the pick-up coil 100.

One terminal of the pick-up coil 100 is connected via a resistor 101 to the positive terminal of a battery and via a forwardly connected diode 102 to the common line (earth), respectively. The diode 102 is used for compensating the temperature in a transistor $T_1$. A reverse connected diode 103 with respect to the battery is connected across the diode 102 to bias the reverse voltage applied across the diode 102. The other terminal of the pick-up coil is connected resistors 104 and 105 to the base of the transistor $T_1$. Between the resistors 104 and 105, is connected a capacitor 106 for suppressing noise. On the other hand, across the resistor 105, is connected a capacitor 107 which acts to pass a switching signal from the pick-up coil 100 through the capacitor 107 to the transistor $T_1$.

The forward voltage drop across the diode 102 is designed so as to be slightly high with respect to the potential drop between the base and emitter of the transistor $T_1$. Therefore, a current flows through the base and emitter of the transistor $T_1$, resistor 101, the pick-up coil 100 and resistors 104 and 105 until the base of the transistor $T_1$ is biased in the reverse direction, which maintains the transistor $T_1$ in the ON (conductive) mode.

The collector and emitter of the transistor $T_1$ are respectively via a resistor 109 and a resistor 110 to the positive terminal of the battery and the common line. A diode 108 is reversely connected between the base of the transistor $T_1$ and the common line to avoid the application of the reverse voltage between the base and emitter thereof.

The operation of the reference ignition signal generator 1 arranged in this manner will be now explained.

When the voltage is induced in the pick-up coil 100 with the positive polarity at the terminal thereof connected to the diode 102 and drops to a point 'b' in FIG. 4 (a), the transistor $T_1$ is increasingly biased in the reverse direction thus to turn the transistor $T_1$ off. The induced voltage in the pick-up coil 100 further increases in the negative direction and as soon as it reaches a point 'c', the polarity of the induced voltage abruptly reverses with the positive polarity at the terminal of the coil connected to the resistor 104. When the voltage arrives at a point 'd' in the course of the reversing, the transistor $T_1$ is again put at operative level, which cause the transistor $T_1$ to turn on. It will be appreciated from the foregoing that while the voltage across the pick-up coil is between a point 'b' and a point 'd', the transistor $T_1$ is off, while, the voltage is between a point 'd' and a point 'b" in the next waveform, the transistor is on. The transistor of the transistor $T_1$ is shown as function with respect to the collector potential thereof in FIG. 4 (b).

Since the reference ignition signal generator 1 is arranged so that turning the transistor $T_1$ off will turn on the power transistor in the ignition circuit 3, as long as the transistor $T_1$ is off, that is, the voltage across the pick-up coil 100 is at a point between the points 'b' and 'd', the power transistor remains on. As soon as the coil voltage reaches the point 'd', the transistor $T_1$ is turned on and on the contrary, the power transistor is turned off. At the same time, the primary current in the ignition coil is cut off to induce an ignition voltage in the secondary winding thereof.

Turning next to the amplifier 2 for amplifying the reference ignition signal, it is provided with a transistor $T_2$ the base of which is connected through a resistor 201 to the collector of the transistor $T_1$. The emitters of the transistors $T_1$ and $T_2$ is directly connected and then connected through an emitter resistor 110 to a common line. The transistors $T_1$ and $T_2$ form a Schmitt circuit. The collector of the transistor $T_2$ is connected via a resistor 202 to the positive terminal of the battery.

The base, collector and emitter of an amplifying transistor $T_3$ are connected respectively, to the collector electrode of the transistor $T_2$, to the positive terminal of the battery via a resistor 203, and directly to the common line. The collector of the transistor $T_3$ is connected via a line $l_1$ to the retard ignition signal generator B to pass the reference ignition signal. The collector is also connected through a forward connected diode 204 to the base of a transistor $T_4$.

On the other hand, the collector of the transistor $T_4$ is connected through a resistor 205 to the positive terminal of the battery and the emitter thereof is directly to the common line. A capacitor 206 is provided between the base and emitter of the transistor $T_4$. The capacitor 206 is formed between the P and N layers of the monolithic IC and the electrostatic capacity thereof is on the order of 30 picofarads. The capacitor 206 and the diode 204 form a Miller integrator and functions to delay the turn-off time of the transistor $T_4$ by microseconds.

The collector of the transistor $T_4$ is coupled to the base of a transistor $T_5$. The collector and emitter of the transistor $T_5$ are respectively to the positive terminal of the battery via a resistor 207 and to the common line via a resistor 208. The emitter of the transistor $T_5$ is directly coupled to the base of a transistor $T_6$. The collector and emitter of the transistor $T_6$ are respectively connected to the positive terminal of the battery via an external resistor 209 and directly to the common line. The interconnection between the base of the transistor $T_5$ and the retard ignition signal generator B is established by means of a signal input line $l_2$, the interconnection between the base of the transistor $T_6$ and the current limit time reducing circuit 5 is established by means of a signal input line $l_3$.

The above-mentioned amplifier 2 operates as follows.

Since while the transistor $T_1$ is on, the collector of the transistor $T_1$ has an identical potential with the emitter of the transistor $T_2$, the transistor $T_2$ remains off without flowing a current between the base and emitter thereof. As soon as the output voltage from the pick-up coil 100 causes the transistor $T_1$ to be cut off, the collector potential of the transistor $T_1$ increases to conduct current between the base and emitter of the transistor $T_2$, turning the transistor $T_2$ on. Since the transistors $T_1$ and $T_2$ form a Schmitt circuit, such operation is carried out in a very short time. The on state of the transistor $T_2$ continues until the transistor $T_1$ is turned on by the output signal from the pick-up coil, that is, the reference ignition signal generates. The state of the operation in the transistor $T_2$ is shown as a function with respect to the collector potential thereof in FIG. 4 (c).

The operational signal shown in FIG. 4 (c) is further inverted and amplified through the transistor $T_3$. The inverted and amplified signal is sent via the diode 204 to the transistor $T_4$ and the same time via the line $l_1$ to the retard ignition signal generator B. This operation is illustrated as a function with respect to the collector potential of the transistor $T_3$ in FIG. 4 (d). When the transistor $T_3$ is turned off and the collector thereof becomes high level, a current flows between the base and emitter of the transistor $T_4$ via the diode 204, thereby to turn the transistor $T_4$ on. In this case, the current through the diode 204 charges the biasing capacitor 206 with the polarity shown in FIG. 1. For this reason, even if the transistor $T_3$ is turned on thus to drop the collector potential thereof to the common line potential, while the charge accumulated in the capacitor 206 is discharged through the base and emitter of the transistor $T_4$, the transistor $T_4$ maintains on. This means that the transistor $T_4$ will not be turned off immediately. This operation is illustrated as a function with respect to the collector potential of the transistor $T_3$ and the collector potential with respect to the transistor $T_4$ in FIG. 4 (d) and (e), respectively. The transistor $T_4$ is cut off time $\tau_1$ later after the transistor $T_3$ is switched from the off mode to the on mode. $\tau_1$ is on the order of microseconds.

Turning the transistor $T_4$ off will conduct current through the resistor 205, the base and emitter of the transistor $T_5$ and then the resistor 208, which causes the transistor $T_5$ to be turned on. This operational state is shown as a function with respect to the collector potential of the transistor $T_5$ in FIG. 4 (f). Current through the collector and emitter of the transistor $T_5$ and the resistor 208 is partly directed to the base and emitter of the transistor $T_6$. Turning the transistor $T_5$ on will turn the transistor $T_6$ immediately. As a result, current flowing so far through the resistors 209 and 210 to the ignition circuit 3 as the post stage will start flowing through the collector and emitter of the transistor $T_6$ to the common line, resulting in the cutting off of the power transistor in the ignition circuit. Therefore, the ignition by means of the reference ignition signal without a retard ignition signal will be actually achieved time $\tau_1$ later after the pick-up coil voltage reaches a point 'd' in FIG. 4 (a).

On the other hand, where the retard ignition signal generator B is operatively coupled to the advance ignition signal limiting circuit A, if the reference ignition signal is supplied to the retard ignition signal generator B via the line $l_1$ simultaneously when the transistor $T_3$ is turned off, a retard ignition signal is applied from the generator B to the base of the transistor $T_5$ via the line $l_2$. In this case, the retard ignition signal has a time width $T_3$ and is issued which lags from the reference ignition signal by time $\tau_2$ as illustrated in FIG. 4 (g). To this end, the cut-off lag time $\tau_1$ of the transistor $T_4$ through the Miller integrator is selected to be greater than the retard time $\tau_2$ after the transistor $T_3$ is turned on before the retard ignition signal is applied to the base of the transistor $T_5$. The retard ignition signal acts to lower the base potential of the transistor $T_5$ to the common line potential. For this reason, turning the transistor $T_4$ off will not increase the base potential of the transistor $T_5$ immediately and will maintain it at the common line potential as far as the trailing edge of the retard ignition signal. As a result, in the case the retard ignition signal is issued, the power transistor in the ignition circuit 3 is turned off the time $(\tau_2+\tau_3)$ later, that is, the time after the transistor $T_3$ is turned on before arriving at the trailing edge of the retard ignition signal. The ignition will be delayed $\theta_1=(\tau_2+\tau_3-\tau_1)$ as compared with the ignition by means of the reference ignition signal. This operation is given as a function with respect to the collector potential of the power transistor circuit when the ignition circuit operates, and of the collector potential thereof when a retard ignition signal activates the ignition circuit, in FIG. 4 (h) and (l), respectively.

Turning next to the ignition circuit 3, a power transistor circuit consisting of two transistors $T_7$ and $T_8$ is contained. The two transistors $T_7$ and $T_8$ are interconnected to form a Darlington connection. The base of the transistor $T_7$ is connected via a resistor 210 to the collector of the transistor $T_6$, the collector thereof is directly connected to the collector of the transistor $T_8$, and the emitter thereof is directly to the base of the transistor $T_8$. The collector of the transistor $T_8$ is connected via a primary winding $C_1$ of an ignition coil C to the positive terminal of the battery, and the emitter thereof is connected via a resistor 301 to the common line. In addition, between the collector and the common line, is provided a diode 305 in the reverse direction. Between the base and emitter of the transistor $T_7$ and between the base and emitter of the transistor $T_8$, respectively, are provided resistors 302 and 303. Between the collector and base of the transistor $T_8$, is placed a Zener diode 304, with the anode at the collector and the cathode at the base.

The ignition circuit 3 operates as follows.

When the transistor $T_6$ is turned on in response to the reference ignition signal or a retard ignition signal, current flowing so far through the resistors 209 and 210 to the base of the transistor $T_7$ will stop, which results in the turning off of the transistor $T_7$. At the same time, the transistor $T_8$ is also turned off in which current has been flowing through the collector and emitter of the transistor $T_7$ into the base of the transistor $T_8$. This interrupts the current flowing so far through the collector and emitter of the transistor $T_8$ into the primary winding $C_1$ of the ignition coil C, thus inducing a high voltage on the secondary winding $C_2$ of the ignition coil C. This high voltage is due to the flyback voltage in the ignition coil C.

In a case where incorrect ignition provides a reverse application of the high voltage across the secondary winding of the ignition coil to between the emitter and collector of the transistor $T_8$, the diode 305 acts to protect the transistor $T_8$ against such a high voltage by biasing the high voltage. The two transistors $T_7$ and $T_8$ in Darlington connection (which has been already explained earlier) and the Zener diode 304 may be formed as a single semiconductor chip, for example, such as disclosed in the Japanese Laid-open Publication No. 27277/77 in which two P layers for transistors and one P layer for a Zener diode are incorporated in a common N layer.

There is shown in FIG. 1 the current limiting circuit 4 which includes resistors 401 and 402 in series which are connected across the resistor 301. A connection between the resistors 401 and 402 leads to the base of a transistor $T_9$. The collector and emitter of the transistor $T_9$ are respectively to the collector of the transistor $T_6$ and to the common line. The operation and configuration of such a current limiting circuit is well known. For example, one of such current limiting circuits is disclosed in the U.S. Pat. No. 3,605,713.

The operation of the current limiting circuit 4 used in the illustrated embodiment will be explained in the following.

When the transistor $T_6$ is turned off to turn the power transistor on, the primary winding current will increase not in the step form but in the gradually increasing form due to the reactance of the primary winding, as seen best in FIG. 4 (j). The voltage drop across the resistor 301 increases linearly with the primary winding current. As soon as the primary winding current reaches approximately 6 amperes, the voltage drop across the resistor 301 becomes a predetermined value, which provides a potential enough to turn the transistor $T_9$ to the connection between the resistors 401 and 402. Turning the transistor $T_9$ on will cause part of the current so far supplied into the base of the power transistor to be directed to the common line via the collector and emitter of the transistor $T_9$. This decreases the base current of the power transistor, so that increase of the primary winding current stops, resulting in a constant current of 6 amperes of the primary winding current. In other words, in order to keep the primary winding current under a predetermined limit, the base current of the power transistor is restricted to increase the impedance between the collector and emitter of the power transistor thereby to suppress the increase of the primary winding current. That is, the current supplied from the battery will not exceed 6 amperes.

In FIG. 4 (j), broken lines indicate the primary current cutting timing due to a reference ignition signal, and solid lines indicate that due to a retard ignition signal.

Turning next to the current limit time reducing circuit 5, the circuit 5 is connected through a line $l_4$ to the collector of the transistor $T_8$ so that the circuit 5 detects potential variation in the collector of the transistor $T_8$ via the line $l_4$ and as soon as the collector potential reaches the predetermined limit, it varies the bias potential to shorten the turn-off time of the transistor $T_1$.

When a retard ignition signal is used to control the ignition timing, the power transistor is put conductive during much longer than the case where a reference ignition signal is used, resulting in a longer current limit time (see FIG. 4 (j)). However, the current limit time reducing circuit 5 acts to reduce the turn-off time of the transistor $T_1$ to a suitable level, as in the above-mentioned manner.

Next, explanation will be made with reference to the parts 7 to 11 in the retard ignition signal generator B.

There is first shown the trigger signal generator 7 in which a reference ignition signal is supplied from the line $l_1$ which, in turn, leads to the collector of the transistor $T_3$.

The reference ignition signal is applied to the base of a transistor $T_{13}$ via a resistor 701.

The emitter and collector of the transistor $T_{13}$ are connected respectively to the common line, and to the base of a transistor $T_{14}$ via a forward connected diode 702. Similarly, the emitter and collector of the transistor $T_{14}$ are connected respectively to the common line, and to the cathode of a diode 703. The collectors of the transistors $T_{13}$ and $T_{14}$ are also connected to the collector of a transistor 801 with multiple collector terminals. The anode of the diode 703 is connected to the anodes of two diode 704 and 705, the cathode of the diode 704 is connected to the collector of the transistor $T_{13}$, and the cathode of the diode 705 is connected to the bistable multi-vibrator 8. In addition, between the base and collector of the transistor $T_{14}$, is provided a capacitor 706 which consists of a capacitance of 10 to 30 picofarads provided between the P and N layers in the monolithic integrated circuit.

The operation of the trigger signal generator 7 will be explained with reference to FIG. 5.

Figure 5:
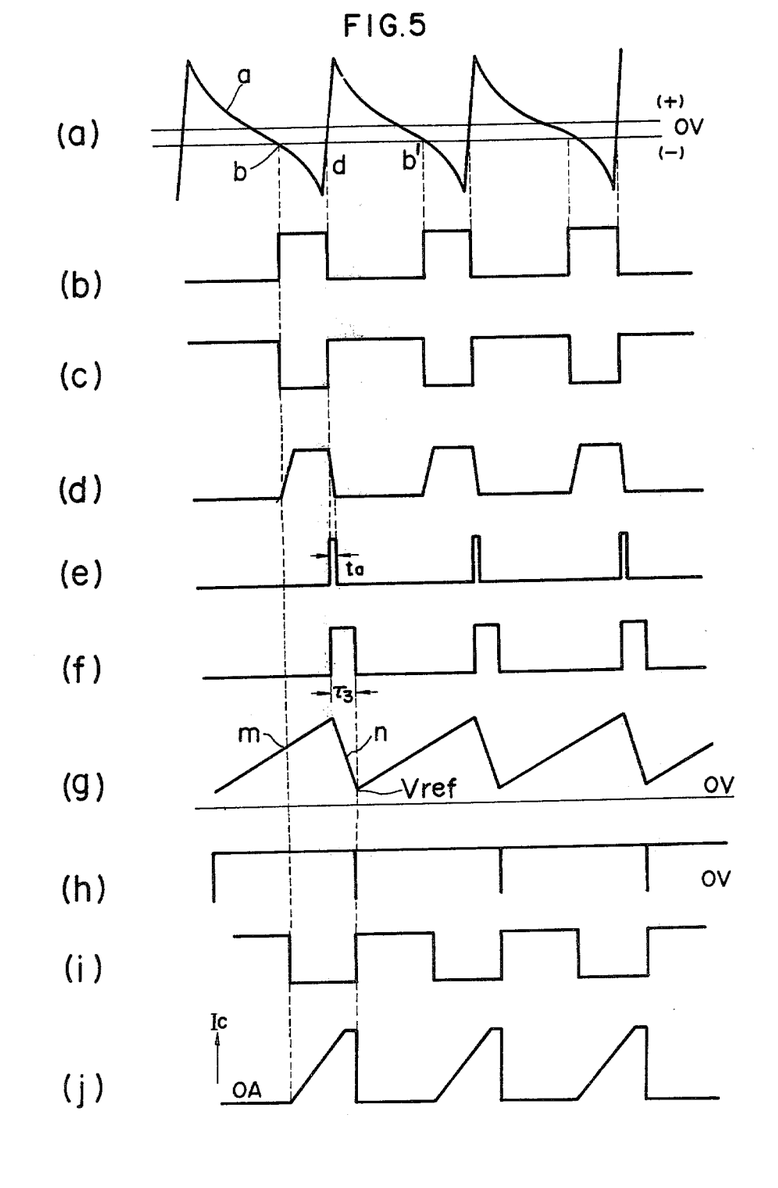
FIG. 5 is a timing diagram showing the operational waveforms of the major parts of a retard ignition signal generator in the system of FIG. 3.

When the pick-up voltage shown in FIG. 5 (a) varies to provide the base of the transistor $T_1$ to a cut-off level, the transistor $T_1$ will be turned off and at the same time, the transistor $T_3$ will be turned off, as seen in FIG. 5 (b). Turning the transistor $T_3$ off will pass current by way of the line $l_1$ from the positive terminal of the battery to the base and emitter of the transistor $T_{13}$, which causes the transistor $T_{13}$ to be turned on. This operation is shown in FIG. 5 (c) as a function with respect to the collector potential of the transistor $T_{13}$. Turning the transistor $T_{13}$ on will stop abruptly the base current of the transistor $T_{14}$ through the diode 702, thus turning the transistor $T_{14}$ off. The charge accumulated so far in the capacitor 706 will start flowing through the base of the transistor $T_{14}$, whereby the transistor $T_{14}$ changes with a slight lag time from the on mode to the off mode (see FIG. 5 (d)).

Then, when the pick-up voltage varies as far as point 'd' to turn on the transistor $T_3$, the transistor $T_{13}$ is turned off to pass current through the base of the transistor $T_{14}$ and the diode 702, thereby turning the transistor $T_{14}$ on.

However, during a very short period the capacitor 706 is charged as shown in the figure, the transistor $T_{14}$ will be turned on with a slight delay, as seen best in FIG. 5 (d). During the delay time interval $t_a$, current will not pass through neither the diode 703 nor 704, as will be understood from FIG. 5 (e). As a result, during the delay time $t_a$, current flows through the diode 705 to the bistable multivibrator 8, and used as a trigger signal shown in FIG. 5 (e).

There is shown a bistable multivibrator 8 which basically consists of two transistors $T_{15}$ and $T_{16}$ which have operating characteristics reverse to each other. The emitter, collector and base of the transistor $T_{15}$ are connected respectively to the common line, to one of the collectors of the transistor 801 via a resistor 802, and to the collector of the transistor $T_{16}$ via a reverse connected diode 803. Likewise, the emitter, collector and base of the transistor $T_{16}$ are connected respectively to the common line, to one of the collectors of the transistor 801 and to the collector of the transistor $T_{15}$ via a resistor 804. Further, the diode 705 has the cathode connected to the base of the transistor $T_{15}$.

The operation of the bistable multivibrator 8 will now be explained.

Applying a trigger signal to the base of the transistor $T_{15}$ via the diode 705 will turn the transistor $T_{15}$ on. As soon as the transistor $T_{15}$ is turned on, the collector potential thereof drops to the common line level, whereby the base potential of the transistor $T_{16}$ becomes at the common line level so that the transistor $T_{16}$ is turned off. Turning the transistor $T_{16}$ off will increase the collector potential thereof, so that current continues to flow through the diode 803 to the base of the transistor $T_{15}$ whereby the transistor $T_{15}$ is put under the on mode.

Since the multi-collector transistor 801 has multiple collectors with respect to a pair of the emitter and base and the base-emitter current is shared with respect to all collectors, currents through the collectors are all the same. In other words, the transistor 801 is configurated as a current mirror circuit.

Referring to the triangular pulse forming circuit 9, the circuit 9 is provided with a transistor $T_{17}$ the base of which is connected to the collector of the transistor $T_{15}$ in the bistable multivibrator 8. In addition, the triangular pulse forming circuit 9 is provided with a discharging/charging capacitor circuit Q which includes two capacitors 901 and 902 in series. The capacitor circuit Q is charged or discharged through a constant-current by means of a constant-current charging circuit and a constant-current discharging circuit.

A transistor $T_{18}$ forms an element of the constant-current discharging circuit. The collector and emitter of the transistor $T_{18}$ are connected to the capacitor circuit Q and to the common line, respectively. The base of the transistor $T_{18}$ is connected both to the common line via the emitter and collector of the transistor $T_{17}$, and to a constant-voltage circuit for providing a constant voltage to the base of the transistor $T_{18}$.

Where the bistable multivibrator 8 produces no output, that is, the transistor $T_{15}$ has a high voltage at the collector thereof; the transistor $T_{17}$ is in the on mode, the base of the transistor $T_{18}$ is at the common line level and thus the transistor $T_{18}$ remains off. In this case, the capacitor circuit Q is charged through the external constant-current charging circuit. Transistors $T_{19}$ and $T_{20}$ form the above-mentioned constant-current charging circuit and act to charge the capacitor circuit Q through a constant-current. The transistor $T_{19}$ has two collectors, that is, a transistor of a multi-collector type, and forms a current mirror circuit. One of the two collectors of the transistor $T_{19}$ is coupled to the capacitor circuit Q, and the other is coupled to the common line via the collector and emitter of the transistor $T_{20}$. The emitter and base of the transistor $T_{19}$ is charged with the two collectors so that the two collectors have an identical current. On the other hand, the base of the transistor $T_{20}$ is connected to the constant-voltage circuit to supply a constant voltage to the same base, so that the collector-emitter current in the transistor $T_{20}$ is constant. This means that a constant current flows through the capacitor circuit Q which leads to the collector of the transistor $T_{19}$, and thereby to charge the capacitor circuit Q through the constant current.

The emitter of the transistor $T_{19}$ is coupled both to the positive terminal of the battery via the external resistor 90, and to the cathode of the Zener diode 905 the anode of which leads to the common line. The switch SW is arranged so that a resistor can be switched either to the anode of the Zener diode 906 or to an external terminal $h_o$. Detection from the output of the atmospheric pressure sensor that the car is running at a high altitude will actuate the switch SW to connect the resistor 907 to the terminal $h_o$. From the terminal $h_o$, is supplied a current to which an output voltage of the pressure sensor N depending on atmospheric pressure is converted through the voltage-current converter. With the switch SW switched in the illustrated position, the Zener diode 906 has the resistor 907 and the diode 908 connected in series therewith. The diode 908 has the cathode connected to the common line. A connection between the resistor 907 and the diode 908 is coupled to the base of the transistor $T_{20}$. The currents $I_1$ and $I_2$ must be selected so that the retard angle obtained under this condition is of the reference ignition timing. Further, the Zener diode 906 has resistors 909 and 910 and a diode 911 (the cathode of which leads to the common line) in series therewith, and a connection between the resistor 910 and the diode 911 is coupled to the base of the transistor $T_{18}$.

A connection between the resistors 909 and 910 is coupled via a resistor 912 to the collector of a transistor $T_{22}$ the emitter of which, in turn, is coupled to a diode 913. The diode 913 has the cathode connected to the common line.

The base circuit of the transistor $T_{18}$ has a constant potential by means of the Zener diode 906, that is, a constant potential determined by the forward voltage drop of the diode 911. The transistor $T_{18}$ and the base circuit thereof form a current mirror type of the constant current circuit, so that the current $I_1$ through the collector and emitter of the transistor $T_{18}$ is equal to that through the base circuit thereof which includes the resistors 909 and 910.

In the similar way to the base circuit of the transistor $T_{18}$, the base circuit of the transistor $T_{20}$ has a constant potential by means of the Zener diode 906, that is, a constant potential determined by the forward voltage drop of the 908. The transistor $T_{20}$ and the base circuit thereof form a current mirror type of the constant-current circuit, so that the current $I_2$ through the collector and emitter of the transistor $T_{20}$ is equal to that through the base circuit thereof which includes the resistor 907.

As has been explained above, the transistor $T_{19}$ is of a multi-collector type. Therefore, the emitter-base current of the transistor $T_{19}$ is shared with the respective collectors thereof so that currents through the collectors are all the same. This means that the current $I_2$ through the collector and emitter of the transistor $T_{20}$ is equal to that through the two collectors of the transistor $T_{19}$.

On the other hand, input of a signal into the external signal terminal $h_2$ will cause the transistor $T_{22}$ to be turned on, which passes a part current $I_3$ out of the current through the resistor 909 into the collector and emitter of the transistor $T_{22}$. This decreases the current $(I_1-I_3)$ through the resistor 910 so that the base current of the transistor $T_{18}$ decreases. Therefore, the charging current $I_1$ for the capacitor circuit Q decreases from $I_1$ to ($I_1$-$I_3$) so that it takes a longer time to discharge capacitor circuit Q until the discharged voltage reaches a predetermined level. A signal is also provided at the terminal $h_2$ during a special condition, i.e., starting of the engine so as to produce the ignition timing shifted from the optimum ignition timing by a retard angle.

Now, the operation of the triangular pulse forming circuit 9 will be described in the following.

As soon as a signal from the trigger circuit 7 turns on the transistor $T_{15}$ in the bistable multivibrator 8, the base potential of the transistor $T_{17}$ drops, whereby the transistor $T_{17}$ is turned off. The transistor $T_{18}$ the base of which has been kept at the common line level due to the transistor $T_{17}$, will be then turned on, which forms a constant-current discharging circuit of the capacitor circuit Q. Through the transistor $T_{18}$, flows a total current $I_1$ of the constant-current $I_2$ for charging of the capacitor circuit Q and the discharging current $I_Q$. When the transistor $T_{22}$ is on, the current $I_1$ is expressed as follows.

$$I_1 = (V_{906} - V_{911})/(R_{909} + R_{910}) \quad (1)$$

Where, $V_{906}$ is the breakover voltage for the Zener diode 906, $V_{911}$ is the forward voltage drop of the diode 911, $R_{909}$ is the value of the resistor 909, and $R_{910}$ is the value of the resistor 910.

As soon as the terminal voltage across the capacitor circuit Q arrives at the reference voltage $V_{ref}$ during discharging, the output circuit 10 at the latter stage will operate to invert the bistable multivibrator 8, so that the transistor $T_{15}$ has a high level at the collector thereof. This will again cause the transistor $T_{17}$ to be turned on to drop the base potential of the transistor $T_{18}$, thus turning the transistor $T_{18}$ off. As a result, the discharging of the capacitor circuit Q stops. At the same time, the capacitor circuit Q begins charging through the constant current $I_2$ which is supplied from the transistor $T_{19}$.

The constant current $I_2$ is given as follows.

$$I_2 = (V_{906} - V_{908})/R_{907} \quad (2)$$

Where, $V_{906}$ indicates the breakover voltage of the Zener diode 906, $V_{908}$ is the forward voltage drop of the diode 908, and $R_{907}$ is the value of the resistor 907.

In this way, since the capacitor circuit Q is charged and discharged through the constant currents $I_1$ and $I_2$, the terminal voltage appears as a triangular waveform (or saw-tooth) pulse with constant gradients 'm' and 'n', as seen in FIG. 5 (g). In the illustrated embodiment, the discharging current $I_1$ is about 100 milliamperes and the charging current $I_2$ is about 5 milliamperes.

Turning the transistor $T_{22}$ on will pass into the diode 913 the part current $I_3$ of the base current through the transistor $T_{18}$ which determines the discharging current. The shunt ratio of the base current of the transistor $T_{18}$ to the part current $I_3$ is set to be on the order of 1:0.5 to 1:3. At the same time, the cathode areas of the diodes 911 and 913 is selected so that the densities of the currents through the diodes 911 and 913 are essentially the same. This is helpful in matching both the forward temperatures characteristics of the diodes 911 and 913 through which a large current flows as compared with the charging current.

The non-common-line terminal of the capacitor circuit Q is connected to the anode of a diode 903 the cathode of which, in turn, is connected via the resistor 90 to the positive bus of the battery. With a power switch K at the closed position, the diode 903 has a high level at the cathode thereof, thus passing no current through the diode 903. When the power switch K is switched to the open position, the power bus voltage drops to the common line level, whereby the change accumulated in the capacitor circuit Q is moved to the common line via the diode 903 and the resistor 90. Then, the power switch K is turned on, the terminal voltage across the capacitor circuit Q becomes zero.

There is shown in FIG. 1 the output circuit 10 which has resistors 121 and 122 and a comparator CMP. The resistors 121 and 122 are connected in series combination, across the Zener diode 906 in the triangular pulse forming circuit 9 so as to produce the reference voltage $V_{ref}$. The non-grounded terminal of the resistor 122 is coupled to the negative input terminal of the comparator CMP, and the non-grounded terminal of the capacitor circuit is coupled to the positive input terminal of the comparator CMP. The output terminal 124 of the comparator CMP is coupled both to the collector of the transistor $T_{16}$ in the bistable multivibrator 8, and to the base of a transistor $T_{23}$ via a resistor 123. The emitter and collector of the transistor $T_{23}$ are coupled to the common line and to the collector of the transistor $T_4$ in the amplifier circuit 2 via the line $l_2$, individually.

The output circuit 10 operates as follows.

When the capacitor circuit Q in the triangular pulse forming circuit 9 discharges to reach the reference voltage $V_{ref}$ at the negative terminal of the comparator CMP, the last stage transistor (not shown) in the comparator CMP is turned on to provide the common line level to the output terminal 124 of the comparator. Accordingly, the base potential of the transistor $T_{15}$ drops through the diode 803, thereby turning off the transistor $T_{15}$. Turning the transistor $T_{15}$ off will increase the collector potential thereof to provide current to the base of the transistor $T_{16}$. This will turn the transistor $T_{16}$ on, and thereby to invert the bistable multivibrator. In this case, the base current of the transistor $T_{17}$ in the triangular pulse forming circuit 9 begins flowing, thereby causing the transistor $T_{17}$ to be turned on. Turning the transistor $T_{17}$ on will provide the common line level to the base of the transistor $T_{18}$, so that the transistor $T_{18}$ is turned off thus to stop discharging the capacitor circuit Q. As a result, the charging of the capacitor circuit Q starts again through the constant current $I_2$ to generate the next reference ignition signal, and continues until a trigger signal from the trigger circuit 7 causes the bistable multivibrator to be inverted.

There is shown in FIG. 5 (f) the inverting operation of the bistable multivibrator 8 as a function with respect to the collector potential of the transistor $T_{16}$, in which the discharging time interval of the capacitor circuit Q corresponds to the inverse time interval $\tau_3$ of the bistable multivibrator, as will be seen as a matter of course.

On the other hand, the output of the comparator CMP will drops the base potential of the transistor $T_{23}$ to the common line level, thereby turning off the transistor $T_{23}$. This will pass the current flowing through the line $l_2$ to the base of the transistor $T_5$ so that the transistor $T_5$ is turned on to cut off the power transistor in the ignition circuit 3, thereby cutting off the primary current in the ignition coil. The above-mentioned operations are shown in FIG. 4 (g), (i) and (j). It will be seen from FIG. 4 (j) that the primary winding current on the ignition coil C is cut off at a time shifted by retard angle $\theta_1$ with respect to the reference ignition time (indicated by a broken line). It is this moment that the optimum ignition timing is during the normal operation of the engine.

As will be seen from FIG. 5 (h), when the discharging voltage of the capacitor circuit reaches $V_{ref}$, the output from the comparator CMP drops to the common line level instantaneously. At the output time, the collector potential of the transistor $T_{23}$ changes from the common line level to a high level (see FIG. 5 (i)) and at the same time, the primary winding current $I_c$ is cut off (see FIG. 5 (j)).

Referring now to the switching circuit 11, there is provided a transistor $T_{24}$ the collector of which leads to one of the collectors of the multi-collector transistor 801. The emitter of the transistor $T_{24}$ is connected to the common line. The base of the transistor $T_{24}$ is connected both to a diode 311 the anode of which leads to the common line, and to the positive terminal of the battery via an external resistor 91 and a switch S. In addition, the collector of the transistor $T_{24}$ is connected both to the base of a transistor $T_{25}$ via a resistor 312, and to the base of a transistor $T_{26}$ via a resistor 313. The collector and emitter of the transistor $T_{25}$ are connected to the base of the transistor $T_{15}$ in the bistable multivibrator 8 and to the common line, respectively.

On the other hand, the collector and emitter of the transistor $T_{26}$ are directly connected to the base of the transistor $T_{17}$ in the triangular pulse forming circuit 9, and to the common line, respectively.

The operation of the switching circuit 11 will be explained in the following.

When the power switch K is turned on, current flows through the resistor 90 and the Zener diodes 905 and 906, whereby different voltages appear across the Zener diodes 905 and 906. This will activate the constant-current charge/discharge circuit in the triangular pulse forming circuit 9, the output circuit 10, the bistable multivibrator 8 and the trigger circuit 7. Therefore, this would supply a retard ignition signal from the retard ignition signal generator B to the advance ignition signal limiting circuit A as long as the power switch K is at the on position.

For this reason, the switch S is turned off in order to stop the retard ignition signal, that is, to shift the ignition timing from the optimum ignition timing by an advance angle. Turning the switch S off will turn the transistor $T_{24}$ off to increase the collector potential thereof. This will pass current through the emitter and collector of the transistor 801 and the resistors 312 and 313 to the bases of the transistors $T_{25}$ and $T_{26}$, causing the transistors $T_{25}$ and $T_{26}$ to be turned on. Turning on the transistor $T_{25}$ will connect a trigger signal to the common line via the diode 705 of the trigger circuit 7 and the collector and emitter of the transistor $T_{25}$, which makes it impossible to invert the bistable multivibrator 8.

As has been already described above, as soon as the power switch K is turned off, the charge accumulated in the capacitor circuit Q will discharge through the diode 903. Accordingly, immediately after the power switch K is turned on, the terminal voltage across the capacitor circuit Q will be lower than the reference voltage $V_{ref}$ from the comparator CMP. This means that the voltage at the output terminal 124 of the comparator CMP drops to the common line level and the transistor $T_{15}$ in the bistable multivibrator 8 has a low potential at the base thereof, with the transistor $T_{15}$ is in the off mode. Thus, just after the power switch K is turned on, the transistor $T_{15}$ will be off and the transistor $T_{16}$ will be on, in the bistable multivibrator 8. For this reason, under a condition where it is impossible to invert the bistable multivibrator 8 as has been described above, the transistor $T_{17}$ connected at the base thereof to the collector of the transistor $T_{15}$ will be on, the transistor $T_{18}$ will be off, and the discharging circuit for the capacitor circuit Q will be cut off. On the other hand, the open position of the switch S means that the transistor $T_{26}$ is on, and thus the base of the transistor $T_{17}$ drops to the common line level through the transistor $T_{26}$, so that even if the transistor $T_{15}$ in the bistable multivibrator 8 is in the off mode, the transistor $T_{17}$ will not be turned on. As a result, the transistor $T_{18}$ is turned on to form the discharging circuit for the capacitor circuit Q. The charging current $I_2$ through the capacitor circuit Q also flows through the transistor $T_{18}$, and thereby to maintain the terminal voltage across the capacitor circuit at the common line level. With the terminal voltage across the capacitor circuit Q at the common line level, since the output of the comparator CMP is also at the common line level, the transistor $T_{23}$ will remain of and the output line $l_2$ will be always at the same level as the collector potential of the transistor $T_4$.

In this way, as long as the switch S is off a trigger signal will not issue a retard ignition signal from the output circuit.

The switch S may be replaced with an electronic switch such as a transistor, in addition to a mechanical switch. Further, the switch S may be used with not only a single switch but also a logical operation circuit of two or more switches. Depending on the type of the used engine, conditions required for the retard ignition signal might be different between one another. In either case, if only the switch S circuit is replaced with one which has operating characteristics suitable for the conditions required by the engine, the other parts of the system according to the present invention can be used.

A resistor 70 is connected to the positive line of the battery between the amplifier circuit 2 and the ignition circuit 3 and acts to limit the voltage applied to the amplifier circuit. A Zener diode 80 is connected in parallel with the reference ignition signal generator 1 and acts to stabilize the voltage applied to the reference ignition signal generator 1 and the amplifier circuit 2.

Figure 6:
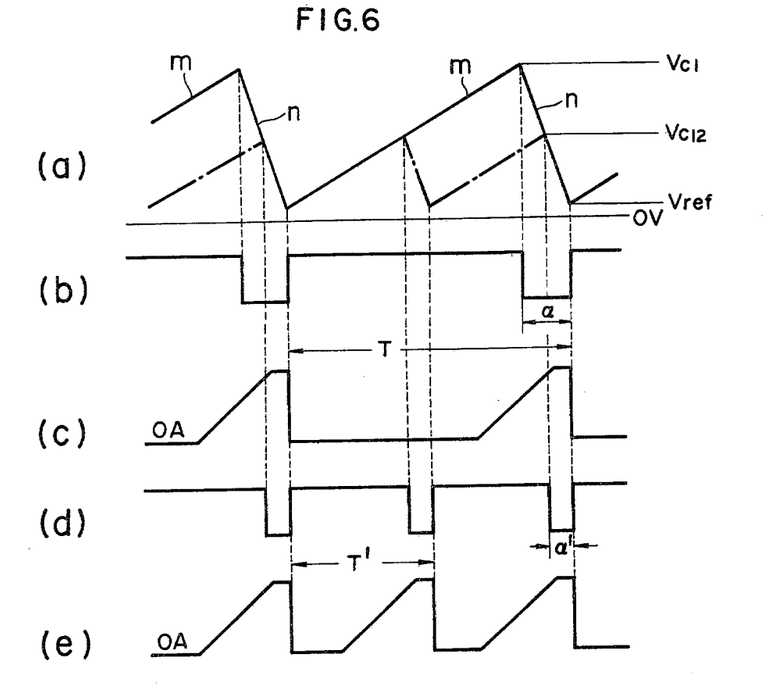
FIG. 6 is a timing diagram showing the operational waveforms used for control of the ignition timing according to the present invention.

As has been already described earlier, when an ignition has been made, the capacitor circuit Q is charged with constant current $I_2$ (which is expressed in expression (2)) through voltage $V_{ref}$. The charging operation will continue until the next reference ignition timing signal. FIG. 6 (b) shows the potential on the output line $l_2$ from the retard ignition signal generator B, and FIG. 6 (c) shows the current on the primary winding of the ignition coil, where, T is the period of the ignition timing and $\alpha$ is the width of the retard ignition signal. Accordingly, the capacitor circuit Q is charged only during the time $(T-\alpha)$, and is discharged during the time $\alpha$ to reach $V_{ref}$. In this case, the voltage $V_{cl}$ when switching is made from the charging to the discharging is written in the form of the expression which appears below.

$$V_{cl} = (I_2/C)(T-\alpha) + V_{ref} \qquad (3)$$

Here, C indicates the capacity of the capacitor circuit Q.

When a reference ignition signal generates, a trigger signal is issued from the trigger circuit 7 to form the constant-current discharging circuit in the capacitor circuit Q, and thereby to discharge the capacitor circuit Q through the above-mentioned constant current. The discharging continues until the terminal voltage across the capacitor circuit Q reaches $V_{ref}$. The voltage $V_{ref}$ is expressed as follows.

$$V_{ref} = V_{c1} - \frac{I_1 - I_2}{C} \cdot a \qquad (4)$$

Arranging expressions (3) and (4), it follows:

$$\frac{I_1 - I_2}{C} \cdot a = \frac{I_2}{C}(T - a)$$

Re-arrangement of the above expression with respect to $I_1$ and $I_2$ gives:

$$I_2/I_1 = a/T \qquad (5)$$

Now, suppose that the time width of the retard ignition signal is $a$ and the retard angle is $\theta_a$, so that, $$\theta_a = 6N \cdot a = (I_2/I_1) \cdot 6NT \qquad (6)$$

This means that since N·T is a constant determined by the number of cylinders for the engine, the retard angle $\theta_a$ is determined by the ratio of the charging current $I_2$ to the discharging current $I_1$, independently of the number of revolutions of the engine. In other words, it is of importance to bear in mind that the retard angle $\theta_a$ varies linearly with the charging current $I_2$. Therefore, when the switch SW in the triangular pulse forming circuit of FIG. 3 is switched to the $h_o$ terminal position to provide to the terminal $h_o$ a current to which an output voltage of the atmospheric pressure sensor depending on atmospheric pressure change is converted through the voltage-current converter, the retard angle of the ignition signal can vary linearly with the control signal, which allows the retard angle to be controlled appropriately.

That is, as the car is driving at a high altitude and the atmospheric pressure decreases, the output of the atmospheric pressure sensor N decreases correspondingly. As soon as the output from atmospheric pressure sensor N decreases below the selected level, actuator O for a switch SW operates to move the switch SW to the terminal '$h_o$' position. At the same time, the output voltage of the atmospheric pressure sensor N is applied to a voltage-current converter P to convert it to a current, which, in turn, flows via the terminal $h_o$ into the resistor 907.

The maximum current through the resistor 907 via the terminal $h_o$ is set to be slightly smaller than the current $I_2$ which has been so far flowing through the resistor 907 before the switching of the switch SW.

The current through the resistor 907 via the terminal $h_o$ decreases linearly as the atmospheric pressure decreases. Accordingly, after the switch SW switches to the $h_o$ position, the current through the resistor 907 is smaller than that through the resistor 907 during driving of the car at a flatland and varies linearly with the atmospheric pressure.

This means that the charging current through the capacitor circuit Q will decrease linearly with the atmospheric pressure, so that the charge accumulated in the capacitor circuit Q decreases correspondingly until the capacitor circuit Q starts discharging. On the other hand, the discharging current through the capacitor circuit Q is the same before the changing-over of the switch SW, and therefore the time necessary for discharging becomes shorter.

As a result, according to the ignition timing control system, decrease of the atmospheric pressure causes proportional decrease in the advance angle of the negative pressure advance mechanism so that the retard angle produced by the retard ignition signal generator will be subtracted by the amount of the ignition timing shifted in the retard direction to shift the ignition timing in the advance direction, thereby maintaining the ignition timing at the optimum condition.

Figure 11:
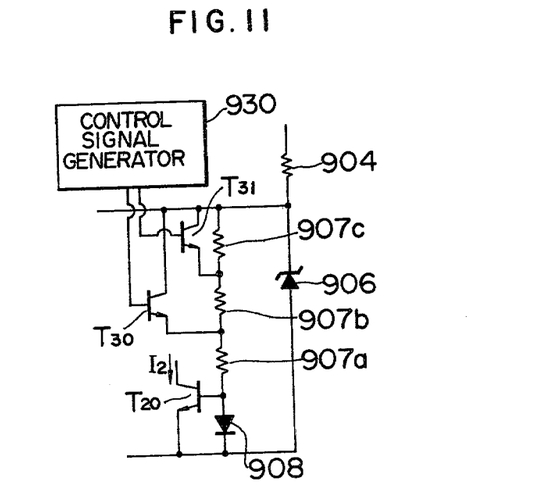
FIG. 11 is a circuit diagram of another embodiment which control the charging current for the capacitor.

The charging current $I_2$ may be also changed in a step manner by means of a circuit shown in FIG. 11. The circuit of FIG. 11 is the same as that of the triangular phase forming circuit 9 in FIG. 3, except that the switch SW and the resistor 907 in FIG. 3 is replaced with other circuit elements. In FIG. 11, across the Zener diode 906, are provided resistors 907c, 907b and 907a and the diode 908. A connection between the resistors 907b and 907a is connected directly to the emitter of the transistor $T_{30}$, and a connection between the resistors 907b and 907c is connected directly to the emitter of the transistor $T_{31}$. The collectors of the transistors $T_{30}$ and $T_{31}$ are connected directly to the cathode of the Zener diode 906, and the bases thereof are connected directly to the control signal generator 930.

The control generator 930 functions to apply to the bases of the transistors $T_{30}$ and $T_{31}$ a signal to render conductive either of the transistors $T_{30}$ or $T_{31}$ cuts off the both, according to change in the atmospheric pressure; so that the resistor 907c or 907b or the two resistors 907b and 907c out of the three resistors 907a, 907b and 907c are short-circuited, or the three resistors are activated, which allows the charging current $I_2$ expressed in expression (2) to be changed stepwise.

Figure 7:
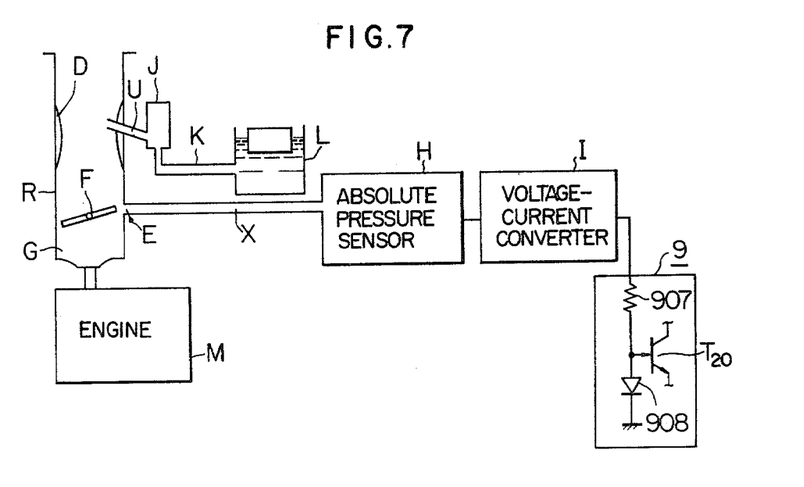
FIG. 7 is a view showing the principle of controlling the ignition timing according to the absolute pressure at a lower portion of the venturi wall in the carbureter.

Referring to FIG. 7, there is shown another embodiment of the ignition timing control system. In the embodiment, a carburetor R makes a mixture of air and fuel to supply it to the engine M. D is a venturi portion in the carbureter D, and a nozzle U is used to inject fuel into the venturi portion D. An air bleeder is provided to meter the fuel fed through a fuel pipe K from a float chamber L according to the amount of the intake air.

A throttle valve F is cooperatively coupled to the associated accelerator pedal (not shown) so that depression of the accelerator causes the opening area in an intake pipe G to increase, thereby increasing the amount of the intake air.

A small hole E is provided on the wall oppose to the throttle valve F. The hole is positioned upstream the throttle valve when the valve is at the fully opened position; the hole is positioned approximately oppose to the end of the throttle valve when the throttle valve is opened so that the number of engine revolutions is 1500 rpm during the operation of the engine at the top gear condition; and the hole is positioned downstream the throttle valve when the throttle is opened in the further forward direction.

An absolute pressure sensor H is provided at the end of a pressure conduit X which leads to the small hole E. There may be used the absolute pressure sensor of the type described in the above-mentioned U.S. Pat. No. 3,894,433. The output voltage of the sensor is fed to a voltage-current converter I which converts the output voltage into a current. The converted current is passed through the resistor 907 in the triangular pulse forming circuit 9 of the retard ignition signal generator B.

The absolute pressure sensor H functions to detect the negative pressure at the small hole H in the form of absolute pressure. As has been explained in connection with FIG. 1, the negative pressure at the small hole E will not vary practically with the atmospheric pressure. However, this negative pressure will change according to the engine load which depends on the opening degree of the throttle valve. Thus, the absolute pressure sensor can detect directly change in the engine load without varying practically with the varying atmospheric pressure.

As a result, control of the retard angle according to this output from the sensor allows the control of the ignition timing according to the engine load regardless of the atmospheric pressure variation.

Figure 9:
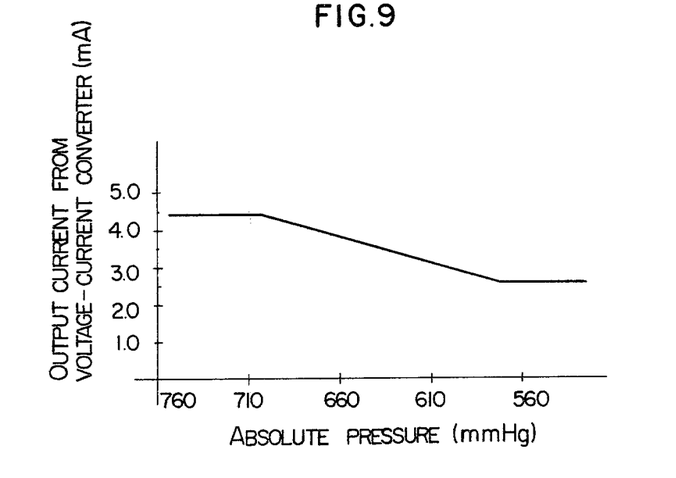
FIG. 9 is a graph showing how the output of the amplifier varies with the absolute pressure at the lower portion of the venturi wall.
Figure 10:
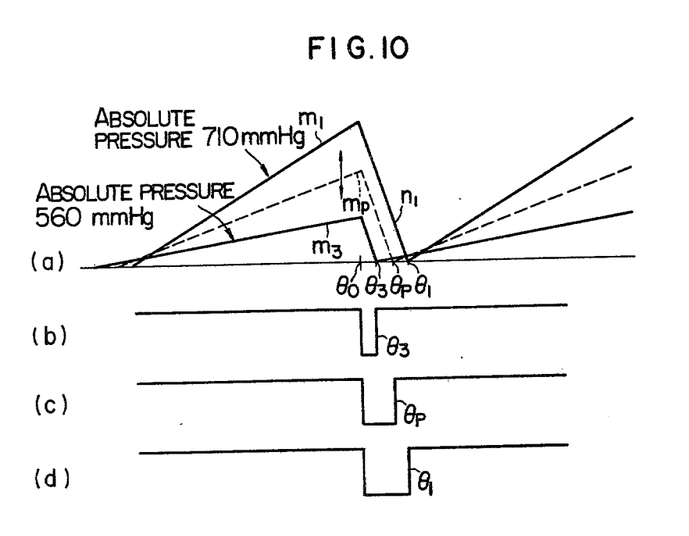
FIG. 10 is a timing diagram showing the major operational waveforms used for control of the ignition timing in accordance with the absolute pressure at the lower portion of the venturi wall.

In this case, the output current from the voltage-current converter is preset to vary as shown in FIG. 9 with respect to the absolute pressure at the small hole E.

That is, when the negative pressure is beyond 710 mmHg, the current through the resistor 907 must be constant and 4.5 mA. If the negative pressure is within the range between 710 mmHg and 560 mmHg, the current must decrease linearly with the negative pressure. Further, when the negative pressure is below 560 mmHg, the current must be constant and 2.5 mA.

Figure 8:
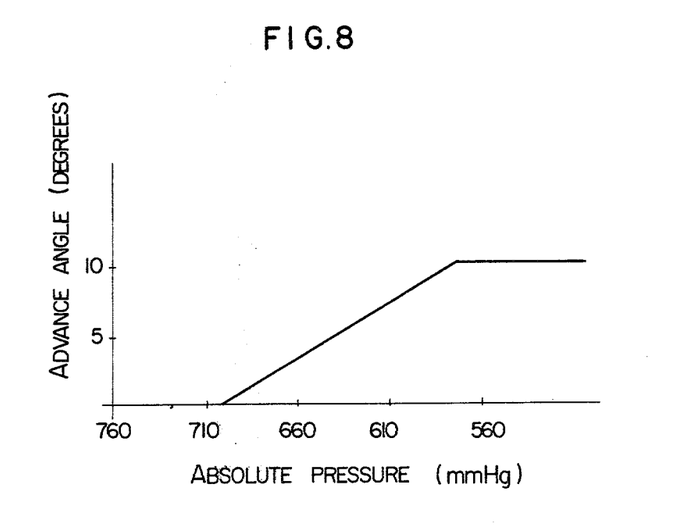
FIG. 8 is a graph showing how the advance angle varies with the absolute pressure at the lower portion of the venturi wall.

Presetting of the current through the resistor 907 with respect to the negative pressure as shown in FIG. 9 provides a characteristic shown in FIG. 8 in which the retard angle is constant and maximum for the range above 710 mmHg, the advance angle is constant and maximum for the range below 560 mmHg, and the retard angle is directly proportional to the absolute pressure within the range between 710 and 560 mmHg.

In other word, the charging current through the capacitor circuit Q in the triangular pulse forming circuit 9 has the most steep slop '$m_1$' when the negative pressure is above 710 mmHg; the current has the most dull slope '$m_3$' when the negative pressure is below 560 mmHg, and the current has a moderate slope '$m_p$' between the intermediate range between 560 and 710 mmHg where the advance angle varies linearly with the negative pressure. On the other hand, since the discharging current has always a constant slope '$n_1$' over the entire negative pressures, the discharging time will increase linearly with the charging slope and the corresponding retard angle will also increase in the order of $\theta_3$, $\theta_p$ and $\theta_1$.

As compared with a prior art ignition timing control system using a diaphragm which mechanically adjusts the ignition signal means in the distributor thus to control the ignition timing according to the engine load, the ignition timing control system of this embodiment has such an advantage that electrical configuration and control of the present system can provide a smaller distributor.

According to the present invention, the ignition timing control system includes the negative pressure advance mechanism which controls ignition timing according to the difference between the atmospheric pressure and the intake pipe pressure, and is arranged so that the ignition timing is compensated according to change in the atmospheric pressure, thereby providing the optimum ignition timing even while the car is running on a heights, without emitting any harmful gas.

Detection of an absolute pressure in the intake pipe to adjust the advance angle permits the negative pressure advance mechanism to be arranged on an electrical basis, eliminating the need for the conventional mechanical negative pressure advance mechanism mounted on the distributor.

While the present invention has been explained with reference to the preferred embodiments shown in the drawings, it should be understood that the invention is not limited to those embodiments but converts all other possible modifications, alternatives and equivalent arrangements included in the scope of the appended claims.

What we claim is:

1. An ignition timing control system for an internal combustion engine comprising:
   a reference ignition signal generator for generating a reference ignition signal in synchronism with the rotation of the engine,
   means for controlling the ignition timing according to the number of engine revolutions,
   means for controlling the ignition timing according to the negative pressure in the intake pipe which varies with the engine load,
   a retard ignition signal generator for generating a retard ignition signal at a point shifted from said reference ignition signal by a selected engine shaft retard angle an ignition circuit driven by said retard ignition signal,
   an atmospheric pressure sensor for detecting change in the atmospheric pressure,
   compensating means for compensating for the ignition timing shifted by atmospheric pressure change into the optimum condition by controlling in response to the output of said atmospheric pressure sensor the electric elements in said retard ignition signal generator to determine the retard angle thereof, and
   switching means for disconnecting said retard ignition signal generator and an amplifier connected parallel to said retard ignition signal generator, whereby when said retard ignition signal generator is disconnected by said switching means, said reference ignition signal amplified by said amplifier will cause the actuation of said ignition circuit.

2. An ignition timing control system for an internal combustion engine comprising:
   a reference ignition signal generator for generating a reference ignition signal in synchronism with the rotation of the engine,
   negative pressure advance means for controlling the ignition timing according to a negative pressure in the intake pipe that varies with the engine load,
   a retard ignition signal generator for generating a retard ignition signal at a point that lags from said reference ignition signal by a selected engine shaft angle, and
   an ignition circuit driven by said retard ignition signal,
   wherein said retard ignition signal generator includes a charging/discharging capacitor circuit, a first transistor for constantly feeding a charging current to said capacitor circuit through the collector-emitter circuit thereof, a second transistor which is turned on at an occurrence point of said reference ignition signal to drain a charge stored in said capacitor circuit while said charging current is fed by said first transistor through a collector-emitter circuit of said second transistor, means for detecting a terminal voltage across said capacitor circuit, means for generating said retard ignition signal when said terminal voltage across said capacitor circuit is reduced to a predetermined value, and means for turning off said second transistor at a point of occurrence of said retard ignition signal, and wherein said negative pressure advance means includes a negative pressure advance mechanism for mechanically controlling the occurrence timing of said reference ignition signal according to the atmospheric pressure, an atmospheric pressure sensor for detecting the atmospheric pressure, and control signal generating means for generating a control signal for controlling the base current of said first transistor according to an output from said atmospheric pressure sensor whereby the charging current which is fed to said capacitor circuit is controlled.

3. An ignition timing control system for an internal combustion engine as defined in claim 2, wherein said retard ignition signal generator further includes:
a third transistor whose collector is connected with the base of said first transistor, the current flowing through the collector of said third transistor being substantially equal to the current flowing through the collector and emitter of said first transistor,
a constant-voltage source,
a first resistor connected between the base of said third transistor and said constant-voltage source,
a first diode connected between the base of said third transistor and ground in the forward direction to produce a forward voltage drop so that the collector current of said third transistor is substantially equal to the current flowing through said first resistor,
a second resistor connected between the base of said second transistor and said constant voltage source, and
a second diode connected between the base of said second transistor and ground in the forward direction to produce a forward voltage drop so that the collector current of said second transistor is substantially equal to the current flowing through said second resistor.

4. An ignition timing control system for an internal combustion engine as defined in claim 2, wherein said control signal generating means includes:
a voltage-current converter for converting the output voltage from said atmospheric pressure sensor to a control current,
switching means for selectively connecting said first resistor with one of said voltage-current converter and said constant-voltage source, and
means for actuating said switching means according to the output from said atmospheric sensor.

5. An ignition timing control system for an internal combustion engine as defined in claim 3 or 4, further comprising means for changing the current flowing through said second resistor according to an engine condition.

6. An ignition timing control system for an internal combustion engine comprising:
a reference ignition signal generator for generating a reference ignition signal in synchronism with the rotation of the engine,
negative pressure advance means for controlling the ignition timing according to the negative pressure in the intake pipe which negative pressure varies with the engine load,
a retard ignition signal generator for generating a retard ignition signal at a point shifted from said reference ignition signal by a selected engine shaft retard angle, and
an ignition circuit driven by said retard ignition signal,
wherein said retard ignition signal generator includes a charging/discharging capacitor circuit, a first transistor for constantly feeding a charging current to said capacitor circuit through the collector-emitter circuit thereof, a second transistor which is turned on at an occurrence point of said reference ignition signal to drain a charge stored in said capacitor circuit while said charging current is fed by said first transistor through a collector-emitter circuit of said second transistor, means for detecting a terminal voltage across said capacitor circuit, means for generating said retard ignition signal at a point that said terminal voltage across said capacitor circuit is reduced to a predetermined value, and means for turning off said second transistor at a point of occurrence of said retard ignition signal, and wherein said negative pressure advance means includes an absolute pressure sensor for detecting the negative pressure in the intake pipe as an absolute pressure, and means for controlling the base current of said first transistor according to an output from said absolute pressure sensor whereby the charging current which is fed to said capacitor circuit is controlled.

* * * * *